United States Patent Office 3,490,999
Patented Jan. 20, 1970

3,490,999
ELECTROLYTIC DISSOLUTION OF METALS FROM URANIUM
Samuel Raviv, Beer-Sheva, Elsa Rabinovitz, Dimona, and Shimon Malkiely, Beer-Sheva, Israel, assignors to The State of Israel, Ministry of Defence, Hakiria, Tel Aviv, Israel
No Drawing. Filed Sept. 26, 1967, Ser. No. 670,777
Int. Cl. B01k 3/00; G21c 19/34, 19/38
U.S. Cl. 204—1.5                                6 Claims

ABSTRACT OF THE DISCLOSURE

Electrolytic dissolution of electro-negative metals and metal alloys of the kind that are passivated by nitric acid, by connecting the metal as a cathode into an electrolytic circuit in which the electrolyte is nitric acid.

---

The present invention concerns a method for the dissolution of metals and metal alloys.

A variety of electro-negative metals and metal alloys are known that are passivated by treatment with nitric acid and are normally either not dissolved at all or dissolved only very slowly by this acid. Examples of such metals and metal alloys are various kinds of stainless steel, Inconel (trade name, alloy containing approximately 78% Ni, 15% Cr and 7% Fe), aluminium, chromium, nickel, uranium, titanium, zirconium, and their alloys. All electro-negative metals and metal alloys which are characterized by a passivation upon treatment with nitric acid will be referred to hereinafter for short as "metals of the kind specified."

It is also known that the resistance of metals of the kind specified to corrosive acidic attack can be increased by so-called cathodic protection. Such a protection consists in connecting the metal as cathode into an electrolytic circuit whereby the rate of corrosion of metals of the kind specified so treated, that is the rate of their attack by acid, is reduced considerably.

It is the object of the present invention to provide a method for the dissolution of metals of the kind specified.

The necessity to dissolve metals of the kind specified arises on various industrial occasions, e.g. for the selective removal of components made of a metal of the kind specified from components made of a different material, e.g. another metal. A particularly important application is the case of uranium fuel elements enclosed within an envelope of a metal of the kind specified.

Uranium fuel elements comprise a core of uranium or uranium alloy and an envelope which conventionally is of aluminium or an aluminium alloy, zirconium or a zirconium alloy, Inconel (trade name) or stainless steel. In the course of nuclear reactions occurring within the reactor, the uranium is gradually fissioned and after a certain time the concentration of the fission products in the fuel elements increases to such an extent that the elements are spent and have to be replaced. Spent uranium fuel elements are highly radioactive and their disposal constitutes a serious problem. It is customary to dispose of spent uranium fuel elements by dissolution and working up the resulting solution for separate recovery of uranium, transuranium elements and the various fission products. For this purpose it is necessary first to remove the envelopes and this is conventionally done by peeling or dissolution of the envelope.

All known methods for the removal of the envelopes from spent uranium fuel elements are tedious and complicated, requiring expensive and bulky equipment and/or the application of severe chemical conditions. It is therefore one specific object of the present invention to provide an improved method for the selective and complete dissolution of the envelope of a uranium nuclear reactor fuel element without affecting the uranium core itself.

In accordance with the present invention it has been discovered quite surprisingly that if a metal of the kind specified is inserted into nitric acid and simultaneously therewith connected as a cathode into an electrolytic circuit, the metal is dissolved. This result could in no way be expected since each of the two expedients, that is nitric acid treatment and connection as a cathode into an electrolytic circuit, when employed by itself, brings about passivation, that is a state that is antagonistic to dissolution.

Based on the above surprising observation the present invention consists in a method for the dissolution of a metal body of the kind specified, comprising immersing the body into nitric acid, connecting it, while so immersed, as cathode into an electrolytic circuit, and allowing electric current to flow in the circuit until the desired degree of dissolution has occurred.

As a rule the concentration of the nitric acid used for the purposes of the present invention should not exceed 12 N since at a higher concentration the passivating effect of nitric acid may prevail with the result that there will be little if any dissolution.

When the metal is stainless steel the preferred range of the nitric acid concentration for the purposes of the present invention is between 2 N and 7 N. In case of Inconel the preferred range is between 5 and 9 N.

In one of its aspects the invention provides a method for the selective dissolution of a uranium fuel element envelope made from a metal of the kind specified, under conditions which do not affect the uranium core, comprising immersing the element into a nitric acid bath of the concentration within the range of 2 to 9 N, connecting the envelope while the element is so immersed as cathode into an electrolytic circuit, and allowing electric current to flow in the circuit until complete dissolution of the envelope.

The completion of the dissolution of the envelope is marked by a sharp drop of the current intensity which is measurable by conventional means.

The dissolution process according to the invention can be carried out at room temperature or at an elevated temperature.

When the envelope is of stainless steel the nitric acid concentration should be within the range of 2 to 7 N and preferably 2 to 5 N. Where the envelope is of Inconel the concentration should be within the range of 5 to 9 N.

The current density on the cathode in the dissolution treatment according to the invention depends on various factors such as the kind of the metal or alloy, the concentration of the nitric acid and the bath temperature. As a rule current densities on the cathode of at least 5 amp/dcm.$^2$ are applied.

The invention is illustrated by the following examples to which it is not limited.

EXAMPLE 1

Plates of non-passivated steel and passivated steel of the kind AISI–304 (18.8% Cr, 10.6% Ni, 69.6% Fe, 0.04% C, 0.95% Mo, 0.9% Si) 0.5 mm. thick and measuring 4 x 5 cm. were submitted to a dissolution treatment according to the invention using a 2 N HNO$_3$ solution at various current densities on the cathode. The bath temperature was 30° C. and the duration of the treatment in each case 10 minutes. The results are indicated in the following Table I.

TABLE I.—CURRENT DENSITY ON THE CATHODE IN AMP

| Dcm.$^2$ | Passivated steel | | Non-passivated steel | |
|---|---|---|---|---|
| | Dissolution in g./m.$^2$ | Thickness of dissolved layer in mm. | Dissolution in g./m.$^2$ | Thickness of dissolved layer in mm. |
| 2.5 | 0.058 | 0.000007 | | |
| 5 | 0.116 | 0.00014 | 5.9 | 0.000737 |
| 10 | 0.23 | 0.000028 | 16.6 | 0.002075 |
| 15 | 18.01 | 0.002251 | 22.9 | 0.002862 |
| 20 | 23.29 | 0.002911 | 28.2 | 0.003525 |
| 30 | 38.36 | 0.004795 | 30.44 | 0.003805 |
| 50 | 52.50 | 0.006562 | 78.8 | 0.009850 |

It is seen from the above Table I that beginning with a current density of about 15 amp/dcm.$^2$ the rate of dissolution of the passivated steel is virtually the same as that of the non-passivated one. This means in other words that at a current density of 15 amp/dcm.$^2$ the passivation of the steel is removed.

EXAMPLE 2

Plates of stainless steel of the type AISI–304 of the same dimensions as in Example 1 were submitted to a dissolution treatment according to the invention using a 2 N HNO$_3$ solution at 30° C. at various current densities and for various durations. The results are tabulated in the following Table II.

TABLE II

| Current density on the cathode in amp/dcm.$^2$ | Rate of dissolution in gr./m.$^2$ | | | | |
|---|---|---|---|---|---|
| | Duration in minutes | | | | |
| | 5 | 10 | 20 | 30 | 60 |
| 5 | | 0.05 | 0.11 | -0.24 | 0.11 |
| 10 | 0.05 | 0.05 | 0.17 | 0.18 | |
| 15 | 7.7 | 19.04 | 38.01 | 57.91 | 104.56 |
| 20 | 9.3 | 20.62 | 46.4 | 73.4 | 109.6 |
| 30 | 12.56 | 27.81 | 68.18 | 126.4 | 176.3 |
| 40 | 16.8 | 46.9 | 76.82 | 127.79 | 272.10 |
| 50 | 19.7 | 53.58 | 118.8 | 154.38 | 333.4 |

As can be seen from the above Table II there is a marked increase of the dissolution with time from a current density on the cathode of 15 amp/dcm.$^2$ and onwards. Below that value the dissolution is insignificant and does virtually not increase with time. These results thus also show that at or around a current density of 15 amp/dcm.$^2$ the passivation is removed while below that value the steel remains passivated and is practically not dissolved.

EXAMPLE 3

Plates of the following metals having the same dimensions as in Example 1 were subjected to a dissolution treatment according to the invention in a 2 N nitric acid solution at 30° C. for 10 minutes and the rate of dissolution as function of the current density on the cathode was established:

Non-passivated stainless steel AISI–304
Inconel (trade name, alloy containing approximately 78% nickel, 15% chromium and 7% iron)
Chromium
Nickel
Passivated stainless steel AISI–304

The results are tabulated in the following Table III:

TABLE III

| Current density on the cathode in amp/dcm.$^2$ | Rate of dissolution in gr./m.$^2$ | | | | |
|---|---|---|---|---|---|
| | Non-passivated stainless steel | Inconel | Nickel | Chromium | Passivated stainless steel |
| 5 | 5.9 | 5.9 | 0.44 | 1.2 | 0.116 |
| 10 | 16.6 | 8 | 0.44 | 1.1 | 0.23 |
| 15 | 22.9 | 8.2 | 0.62 | 1.2 | 18.01 |
| 20 | 28.2 | 10.1 | 0.80 | 1.4 | 23.29 |
| 30 | 30.44 | 13 | 0.96 | 1.4 | 38.36 |
| 50 | 78.8 | 17.4 | | 1.76 | 52.50 |

It is seen from Table III that in cases of the non-passivated stainless steel Inconel and passivated stainless steel there is a pronounced increase of the rate of dissolution with the current density. Also in cases of nickel and chromium there is a certain increase although not so pronounced and also the absolute rate of dissolution is much smaller.

EXAMPLE 4

Stainless AISI–304 steel and Inconel plates of the same dimensions as in Example 1 were submitted to a dissolution treatment according to the invention in nitric acid baths of varying concentrations all at 30° C. at a current density of 15 amp/dcm.$^2$ for 10 minutes. The results obtained are tabulated in the following Table IV.

TABLE IV

| Concentration of acid in N | Rate of dissolution in gr./m.$^2$ | |
|---|---|---|
| | Passivated stainless steel AISI–304 | Inconel |
| 0.5 | 3.35 | 1.45 |
| 1 | 12.7 | 3.6 |
| 1.5 | 15 | 5.85 |
| 2 | 18 | 8.3 |
| 3.1 | 20.2 | 12.2 |
| 4.2 | 22.2 | 16.6 |
| 5.3 | 19.1 | 20.9 |
| 6.3 | 10.8 | 21.7 |
| 7.6 | 0.9 | 22 |
| 8.04 | 0 | 0 |
| 9 | | 0 |

It follows from the above table that the rate of dissolution at first increases with the concentration, passes a maximum which in case of stainless steel is between 2 N and 5 N and in the case of Inconel in the vicinity of 8 N and thereafter rapidly drops again to zero. This shows that for each metal there exists a definite range of acid concentrations within which it is possible to operate in accordance with the invention while outside this range no dissolution will occur. There also exists an optimum concentration for each metal. Obviously both the range and the optimum are dependent both on the nature of the metal of the kind specified as well as on the current density and temperature.

EXAMPLE 5

The rate of dissolution in accordance with the invention was compared with the rate of dissolution of stainless steel by an acidic solution containing 10% by weight of HNO$_3$ and 3% by weight of HF. The treatment according to the invention was effected in a 2 N nitric acid solution at 30° C. and a current density on the cathode of 15 amp/dcm.$^2$, using AISI–304 stainless steel plates of the same dimensions as in Example 1. The results are tabulated in the following Table V.

TABLE V

| Duration | Chemical dissolution by an acidic solution containing 10% of HNO$_3$ and 3% of HF, in g./m.$^2$ | Dissolution according to invention in 2N HNO$_3$, current density on cathode 15 amp/dcm.$^2$, in g./m.$^2$ |
|---|---|---|
| 5' | 3.43 | 7.7 |
| 10' | 12.74 | 19.04 |
| 20' | 28.01 | 38.01 |
| 30' | 48.59 | 57.91 |
| 60' | 83.84 | 104.56 |

It follows from Table V that the rate of dissolution according to the invention is even superior to the rate with the highly corrosive acidic mixture of 10% $HNO_3$ and 3% HF while proceeding at the same time at much milder conditions.

EXAMPLE 6

The selectivity of the dissolution treatment according to the invention with respect to uranium as a function of current density is illustrated in the following Table VI. The stainless steel was again AISI-304, nitric acid was 3 N and the bath temperature 30° C.

TABLE VI

| Current density in the cathode in amp/dcm.² | Dissolution in gr./m.²/hour | |
|---|---|---|
|  | AISI-304 L | Uranium |
| 5 | 36.0 | 0 |
| 10 | 96.6 | 0 |
| 15 | 130.2 | 0 |
| 20 | 154.2 | 0 |
| 30 | 217.2 | 0 |
| 40 | 319.2 | 4.4 |

It follows from the above table that while the dissolution of the stainless steel within the range of from 5 to 14 amp/dcm.² is substantial and increases with the current density on the cathode, the dissolution of uranium under the same conditions is zero in the range of from 5 to 30 amp/dcm.² and is only very slight at 40 amp/dcm.². In practical terms this means that if it is desired to selectively dissolve a stainless steel envelope from a uranium fuel element using a 3 N $HNO_3$ bath it is possible to operate at 30 amp/dcm.² which will produce a complete and rapid dissolution of the stainless steel envelope while the uranium core will remain completely unaffected.

EXAMPLE 7

The selectivity of the dissolution of stainless steel according to the invention with respect to uranium for a given current density, as a function of time, is illustrated in the following Table VII. The stainless steel was again AISI-304, the nitric acid concentration 2 N, the current density on the cathode 40 amp/dcm.² and the bath temperature 30° C.

TABLE VII

|  | Rate of dissolution in gr./m.² | |
|---|---|---|
|  | Stainless steel | Uranium |
| 10 min | 46.9 |  |
| 1 hour | 272 | 3.3 |
| 3 hours | 544 | 3.3 |
| 4 hours | 1,088 | 3.3 |

It is seen from the above table that while there is no uranium dissolution for the first 10 minutes a certain quantity is dissolved after 1 hour. This quantity is however insignificant as compared to the dissolution of the stainless steel and moreover remains constant during 4 hours while the dissolution of the stainless steel increases with time and its rate is very substantial after 4 hours.

EXAMPLE 8

The selectivity of the dissolution of stainless steel in accordance with the invention with respect to uranium as a function of the concentration of the nitric acid is illustrated in the following Table VIII. The stainless steel was again AISI-304, the bath temperature 30° C. and the current density on the cathode 40 amp/dcm.².

TABLE VIII

| $HNO^3$ (N) | Rate of dissolution in gr./m.³/hour | |
|---|---|---|
|  | AISI-304 | Uranium |
| 1 | 66.6 |  |
| 2 | 281.4 | 3.3 |
| 3 | 320.0 | 4.4 |
| 4 | 224.7 | 3.3 |
| 5 | 254.1 | 6.8 |
| 6 | 173.1 | 13.5 |
| 7 | 57.4 | 380.5 |

It is seen from the preceding table that the dissolution of uranium remains insignificant as compared to that of the stainless steel up to a concentration of 6 N. At the concentration of 7 N the dissolution of uranium becomes very significant and exceeds that of the stainless steel. It is further seen that the optimum dissolution of the stainless steel is at the concentration range of 2 to 5 N (see also Example 4) and within this range the stainless steel dissolution selectively is very pronounced even at the current density of 40 amp/dcm.².

The foregoing Examples 6 to 8 demonstrate clearly the possibility of a selective dissolution of a stainless steel envelope of a uranium nuclear fuel element without affecting the uranium core. In practice the entire element is immersed into the nitric acid bath and while so immersed the envelope is connected as cathode into an electrolytic circuit and the treatment is carried on until complete dissolution of the envelope. It should in this connection be noted that while uranium is also one of the metals that can be dissolved in accordance with the invention the selectivity is achieved in that the uranium in these examples is not connected as cathode into an electrolytic circuit while the other metal is so connected.

EXAMPLE 9

The results of dissolution experiments according to the invention conducted with some further alloys are given below. Table IX specifies the alloys and Table X the process conditions and the results.

TABLE IX

| Alloy | Percent | | | | | | |
|---|---|---|---|---|---|---|---|
|  | Cr | Ni | Fe | C | Mo | Si | Co | Mn |
| NS-24 | 23.70 | 14.00 | 58.90 | 0.18 | 1.40 | 0.80 | | |
| NS-30 | 27.00 | 18.00 | 53.20 | 0.30 | 0.50 | 1.00 | | |
| QA-18 | 19.50 | 76.50 | 1.20 | 0.17 | 0.50 | 0.50 | 0.02 | |
| NS-21 | 16.90 | 10.40 | 69.00 | 0.03 | 1.40 | 0.40 | | |
| Inconel | 15 | 78.00 | 7.0 | 0.04 | | 0.20 | 0.35 | |

TABLE X

| Alloy | Temp. in °C. | Time in min. | Conc. of $HNO_3$ | Current density in amp/dcm.² | Dissolution in g./m.² |
|---|---|---|---|---|---|
| NS-24 | 30 | 10 | 4 N | 40 | 40 |
| NS-30 | 30 | 10 | 5 N | 60 | 46.87 |
| QA-18 | 30 | 10 | 6 N | 60 | 48.3 |
| NS-21 | 30 | 30 | 2 N | 60 | 92.4 |
| Inconel | 30 | 30 | 6 N | 50 | 33.63 |

We claim:

1. Method for the dissolution of an uranium fuel element envelope, which method comprises immersing said envelope into nitric acid having a concentration of from 2 N to 9 N, connecting it while so immersed as a cathode in an electrolytic circuit, flowing a unidirectional electric current in the circuit with a current density on the cathode of at least 5 amp/dcm.², and continuing the electric current flow until the desired degree of dissolution has occurred.

2. Method according to claim 1, wherein the current density on the cathode is at least 15 amp/dcm.².

3. Method according to claim 1, wherein said envelope is of stainless steel.

4. Method according to claim 3, wherein the nitric acid concentration is within the range of from 2 N to 7 N.

5. Method according to claim 1, wherein the envelope is of an alloy containing approximately 78% by weight of nickel, 15% by weight of chromium and 7% by weight of iron.

6. Method according to claim 5, wherein the nitric acid concentration is within the range of from 5 N to 9 N.

(References on following page)

References Cited

UNITED STATES PATENTS

| | | | |
|---|---|---|---|
| 2,437,409 | 3/1948 | Tucker | 204—140 XR |
| 2,442,592 | 6/1948 | Feild | 204—140.5 |
| 2,865,832 | 12/1958 | Pitzer | 204—141 |
| 3,002,908 | 10/1961 | Hall | 204—141 |

OTHER REFERENCES

Electrolytic Dissolution of Stainless Steel, by H. E. Henry, July 1959.

AEC Research and Development Report, E. I. du Pont de Nemours & Co., pp. 3–8.

Anodic Passivation Studios, J. D. Sudbury et al., Anatrol Div., Drawer 1267, Ponca City, Okla. Reprinted from Corrosion, vol. 16, No. 2, Feburary 1960, p. 47t.

REUBEN EPSTEIN, Primary Examiner

U.S. Cl. X.R.

204—146